United States Patent
Jones IV et al.

(10) Patent No.: US 6,973,134 B1
(45) Date of Patent: Dec. 6, 2005

(54) OFDM INTERFERENCE CANCELLATION BASED ON TRAINING SYMBOL INTERFERENCE

(75) Inventors: Vincent K. Jones IV, Redwood Shores, CA (US); Derek Gerlach, Mountain View, CA (US); Gregory Raleigh, Woodside, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/565,669

(22) Filed: May 4, 2000

(51) Int. Cl.$^7$ .......................................... H04L 27/28
(52) U.S. Cl. ...................................... 375/260; 375/262
(58) Field of Search .......................... 375/262, 260, 375/267, 316, 340, 341, 346, 347, 349; 455/522, 455/67.3; 342/280

(56) References Cited

U.S. PATENT DOCUMENTS

| | | | |
|---|---|---|---|
| 5,949,793 A | 9/1999 | Bossard et al. | 370/487 |
| 5,982,327 A * | 11/1999 | Vook et al. | 342/380 |
| 6,070,086 A * | 5/2000 | Dobrica | 455/522 |
| 6,442,130 B1 * | 8/2002 | Jones et al. | 370/208 |
| 6,487,253 B1 * | 11/2002 | Jones et al. | 375/260 |
| 6,657,949 B1 * | 12/2003 | Jones et al. | 370/205 |
| 6,661,835 B1 * | 12/2003 | Sugimoto et al. | 375/148 |
| 2002/0009096 A1 * | 1/2002 | Odenwalder | 370/441 |

FOREIGN PATENT DOCUMENTS

| WO | WO 98/09385 | 3/1998 | ............ H04B 7/02 |
|---|---|---|---|
| WO | WO 98/18271 | 4/1998 | ............ H04Q 7/00 |

OTHER PUBLICATIONS

Jones et al., "Improved OFDM channel identification", filed 1999, U.S. Appl. No. 09/234,929.
Jones et al., "Improved system for interference cancellation", filed 1999, U.S. Appl. No. 09/234,629.
Gardner et al., "OFDM channel estimation in the presence of interface", filed 1999, U.S. Appl. No. 09/410,945.

* cited by examiner

*Primary Examiner*—Chieh M. Fan
(74) *Attorney, Agent, or Firm*—Dan Lang; Dov Rosenfeld; Inventek

(57) ABSTRACT

Systems and methods for optimally combining signals from multiple antennas to ameliorate the effects of noise and/or interference on OFDM communications are provided. In one embodiment, an initial spatial statistical characterization of interference and/or noise is based on training symbols received via each antenna. Because the transmitted values of the training symbols are already known, there is no need to estimate their transmitted value to form this initial statistical characterization. The data symbol values received via the multiple antennas are combined based on the initial spatial statistical characterization. The result of this combination step is then used to form a refined spatial statistical characterization of noise and/or interference. The received data symbol values are then recombined based on the refined spatial statistical characterization.

25 Claims, 3 Drawing Sheets

OFDM INTERFERENCE CANCELLATION BASED ON TRAINING SYMBOL INTERFERENCE

STATEMENT OF RELATED APPLICATIONS

The present application is related to the subject matter of co-assigned U.S. application Ser. No. 09/234,629, filed on Jan. 21, 1999, the contents of which are herein incorporated by reference in their entirety.

BACKGROUND OF THE INVENTION

The present invention is related to digital communication systems and more particularly to systems and methods for ameliorating the effects of interference.

It is known to use adaptive spatial processing to exploit multiple antenna arrays to increase the communication quality of wireless systems. A weighting among antennas is chosen based on content of the signals received via multiple antenna elements. The spatial processor selects a weighting that optimizes reception of a desired signal while minimizing the deleterious effects of undesired signals.

OFDM (Orthogonal Frequency Division Multiplexing) is another highly useful communication technique. In OFDM, the available bandwidth is divided into subchannels that are orthogonal to one another in the frequency domain. A high data rate signal is effectively transmitted as a set of parallel low data rate signals, each one being carried over a separate subchannel. OFDM addresses a problem known as multipath caused by differences in delay time among different paths taken from a transmitter to a receiver. The effect of multipath is intersymbol interference created by energy associated with different symbols sharing a common arrival time. By creating multiple low data rate subchannels, OFDM lengthens the period occupied by a single symbol so that dispersive effects tend to be confined within a single symbol period, thereby reducing intersymbol interference.

Co-assigned U.S. patent application Ser. No. 09/234,629 discloses techniques for applying multiple antenna adaptive spatial processing to ameliorating interference in OFDM systems. In one of the techniques described there, an initial estimate is formed for the received data symbols independently for each antenna. This initial estimate is a so-called "hard decision" as to which data symbols was most likely transmitted. Based on this initial estimate, the noise and/or interference is also determined independently for each antenna. The noise and/or interference and its spatial profile is then statistically characterized over time and/or frequency based on the information received from all the antennas. The system then determines cost metric values suitable for input to a trellis decoding process based on the spatial statistical characterization and the raw frequency domain data symbol values as received via each antenna. The data symbol values from the different antennas are effectively combined so as to minimize the impact of interferers.

A problem arises in implementing this technique when there is heavy noise and interference. When a data symbol value becomes corrupted by noise and/or interference, a wrong hard decision results. Under strong noise and/or interference conditions, large numbers of wrong hard decisions degrade the spatial statistical characterization of noise and/or interference to the point that the system no longer optimally combines data symbol values from the antennas. Optimal interference cancellation no longer occurs and in effect, the system loses track of the spatial characteristics of the noise and/or interference and can no longer properly take them into account.

What is needed are systems and methods applicable to OFDM for effectively combining signals from multiple antennas to ameliorate the effects of even strong noise and/or interference.

SUMMARY OF THE INVENTION

Systems and methods for optimally combining signals from multiple antennas to ameliorate the effects of noise and/or interference on OFDM communications are provided by virtue of one embodiment of the present invention. In one embodiment, an initial spatial statistical characterization of interference and/or noise is based on training symbols received via each antenna. Because the transmitted values of the training symbols are already known, there is no need to estimate their transmitted value to form this initial statistical characterization. The data symbol values received via the multiple antennas are combined based on the initial spatial statistical characterization. The result of this combination step is then used to form a refined spatial statistical characterization of noise and/or interference. The received data symbol values are then recombined based on the refined spatial statistical characterization.

One aspect of the present invention provides a method for receiving an OFDM signal via a plurality of outputs of a channel in the presence of noise and/or interference. The method includes: receiving an OFDM burst via the plurality of channel outputs, separating training symbols of the OFDM burst, forming a first statistical characterization of noise and/or interference based on the training symbols received via the plurality of outputs and not on other symbols of the OFDM burst. The method further includes combining data symbols of the OFDM burst as received via the plurality of channel outputs based on the first statistical characterization to form combined data symbol estimates, forming a second statistical characterization of noise and/or interference based on the combined data symbol estimates, and recombining the data symbols of the OFDM burst received via the plurality of channel outputs based on the second statistical characterization.

A further understanding of the nature and advantages of the inventions herein may be realized by reference to the remaining portions of the specification and the attached drawings.

DESCRIPTION OF SPECIFIC EMBODIMENTS

Figure 1:
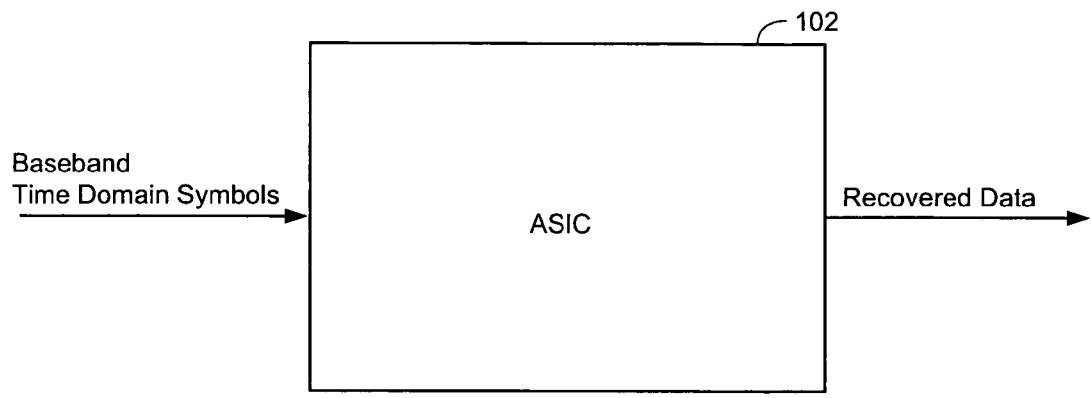
FIG. 1 depicts an ASIC system suitable for implementing one embodiment of the present invention.

The present invention is described in the context of the use of OFDM (Orthogonal Frequency Division Multiplexing) for communication, although the present invention is not limited to OFDM. In OFDM, the available bandwidth is effectively divided into a plurality of subchannels that are orthogonal in the frequency domain. During a given symbol period, the transmitter transmits a symbol in each subchannel. To create the transmitted time domain signal corresponding to all of the subchannels, an IFFT is applied to a series of frequency domain symbols to be simultaneously transmitted, a "burst." The resulting series of time domain symbols is augmented with a cyclic prefix prior to transmission. The cyclic prefix addition process can be characterized by the expression:

$$[z(1) \ldots z(N)]^T \rightarrow [z(N-v+1) \ldots z(N)z(1) \ldots z(N)]^T$$

On the receive end, the cyclic prefix is removed from the received time domain symbols. An FFT is then applied to recover the simultaneously transmitted frequency domain symbols. The cyclic prefix has length v where v is greater than or equal to a duration of the impulse response of the overall channel and assures orthogonality of the frequency domain subchannels.

There are other ways of simultaneously transmitting a burst of symbols in orthogonal channels or substantially orthogonal channels including, e.g., use of the Hilbert transform, use of the wavelet transform, using a batch of frequency upconverters in combination with a filter bank, etc. Wherever the term OFDM is used, it will be understood that this term includes all alternative methods of simultaneously communicating a burst of symbols in orthogonal or substantially orthogonal subchannels. The term frequency domain should be understood to refer to any domain that is divided into such orthogonal or substantially orthogonal subchannels.

A part of such an OFDM communication system will be one or more OFDM receivers. An OFDM receiver receives an OFDM signal in the form of a carrier wave at a carrier frequency. The carrier wave is converted to a baseband signal and converted from analog to digital to form a series of time domain symbols. The time domain symbols are grouped into bursts. Each burst includes the cyclic prefix that was added at the transmitter end. The cyclic prefix is removed from each burst and the burst is converted into the frequency domain. The receiver uses the frequency domain symbols to recover the transmitted data.

A refinement to the OFDM receiver is to take advantage of multiple antennas. For each antenna, the steps leading to development of the frequency domain symbols are performed independently. The receiver then combines the results of processing via each antenna to ameliorate the effects of interference and noise. This combination processing takes advantage of the fact that the desired transmitter and undesired interferers will often tend to distribute their signals among the multiple antennas differently because they radiate from different locations. By statistically characterizing the distribution of desired signals and interferers, the receiver can derive an optimal weighting among antennas to reduce the effects of noise and interference. In OFDM, this weighting is preferably varied for each frequency domain subchannel. In one embodiment, the present invention is directed towards OFDM receivers using improved spatial processing to combine OFDM signals from multiple antennas.

FIG. 1 depicts an application specific integrated circuit (ASIC) 102 suitable for implementing one embodiment of the present invention. ASIC 102 removes the cyclic prefix from time domain bursts, converts the time domain symbols to the frequency domain, and combines the frequency domain symbols from multiple antennas. ASIC 102 may also include other signal processing functions such as error correction coding, deinterleaving, etc. A field programmable gate array (FPGA) or other hardware may substitute for all or part of ASIC 102.

Figure 2:
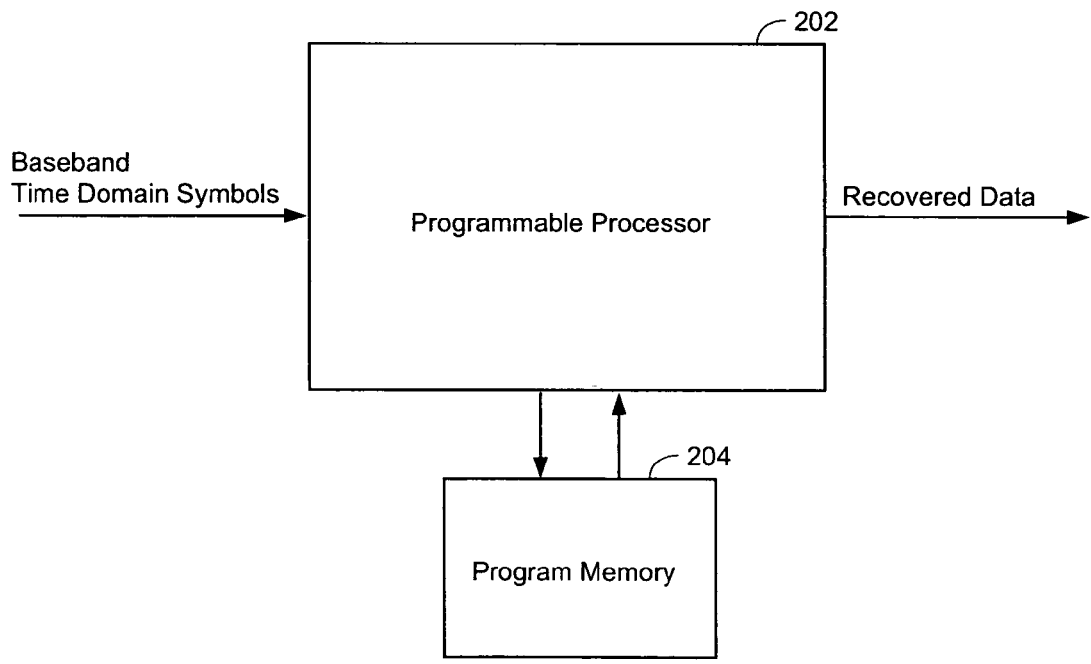
FIG. 2 depicts a programmable processor arrangement suitable for implementing one embodiment of the present invention.

FIG. 2 depicts an alternative scheme for implementing one embodiment of the present invention. A programmable processor 202 runs software stored in a program memory 204 to perform functions essential similar to the functions performed by ASIC 102. Alternatively, these functions may be performed by some combination of an ASIC and a programmable processor. Program memory 204 is typically a short term memory. Long term storage of the software for programmable processor 202 may be in a ROM, a hard drive, a floppy disk, etc. Software may also be obtained via a network such as the Internet.

Figure 3:
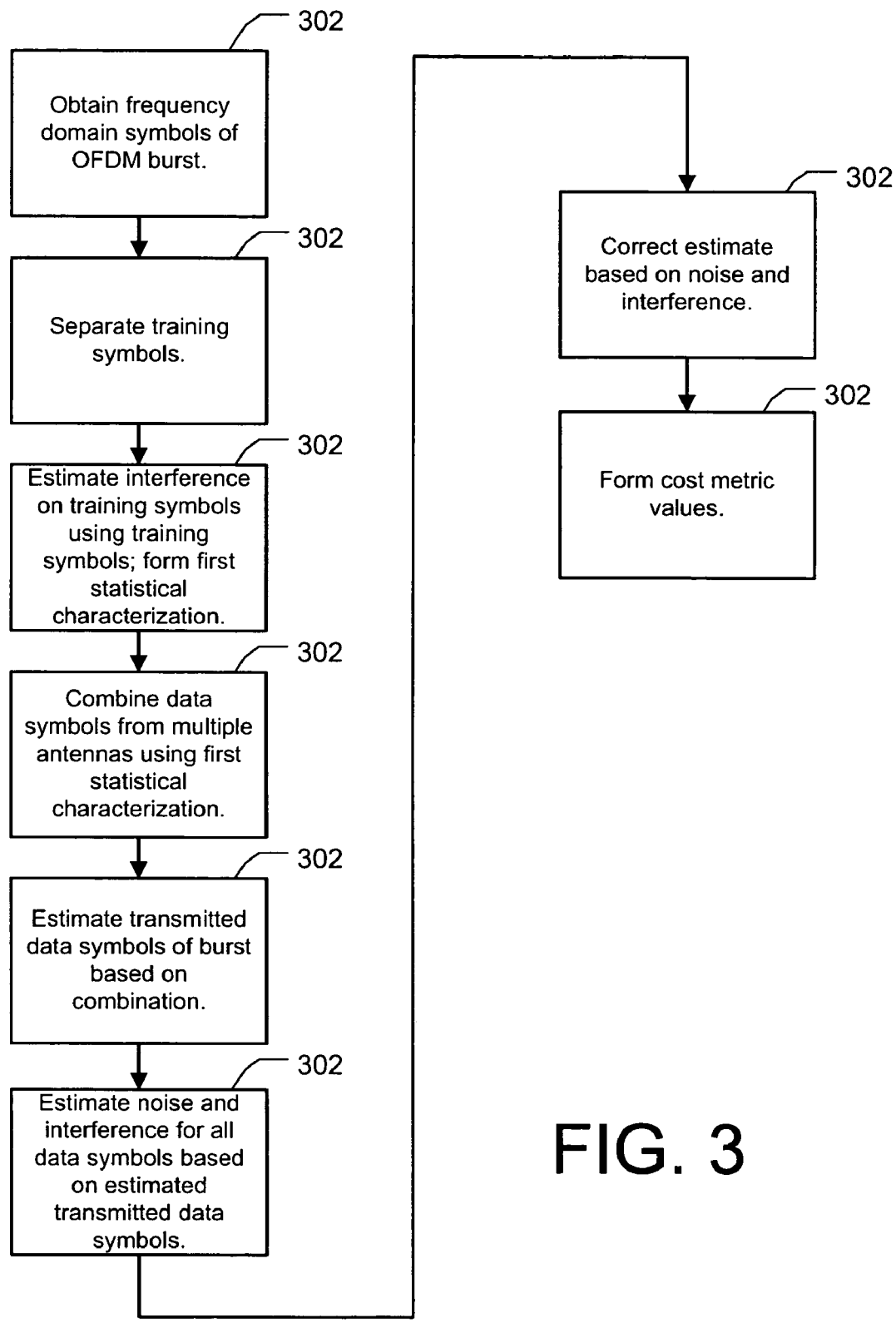
FIG. 3 is a flowchart describing steps of processing received OFDM signals according to one embodiment of the present invention.
Figure 4:
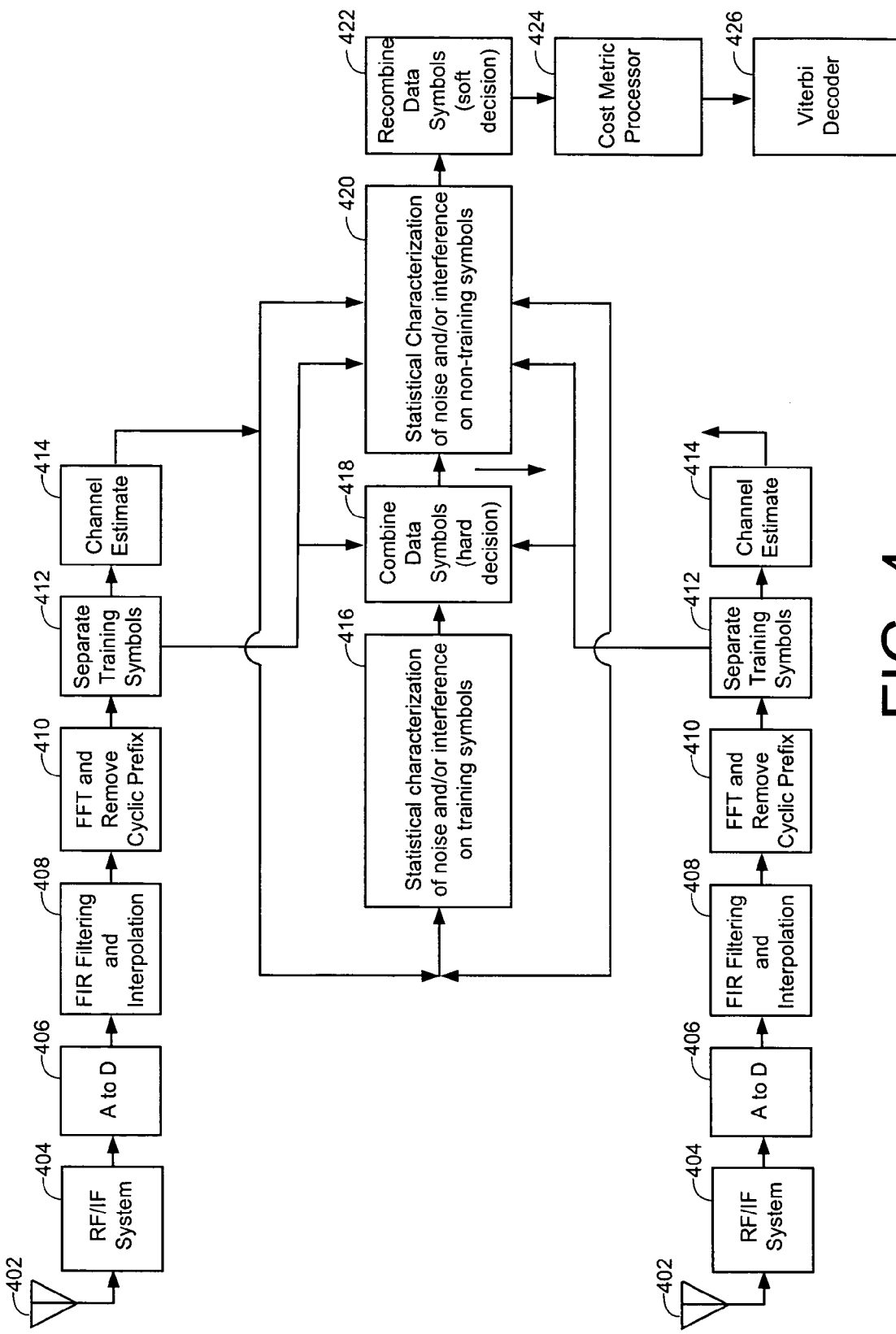
FIG. 4 depicts a diagram of an OFDM receiver according to one embodiment of the present invention.

FIG. 3 is a flowchart describing steps of processing received OFDM signals according to one embodiment of the present invention. FIG. 4 depicts a diagram of an OFDM receiver 400 according to one embodiment of the present invention.

Receiver system 400 collects signals from a plurality of antennas 402. In FIG. 4, two antennas are shown, although any number of antennas may be used. Many components depicted in FIG. 4 are duplicated for each antenna.

Each antenna 402 is coupled to an RF/IF system 404 which performs initial analog filtering and amplification prior to downconversion to an intermediate frequency (IF) where further filtering and signal conditioning may be performed. The signal is then converted to baseband for input to an analog to digital converter 406. Alternatively, analog to digital conversion may occur at the IF. Further filtering and interpolation occurs in an FIR filter block 408. The next stage is an FFT processor 410 that, at step 302, removes the cyclic prefix from N+vlong time domain symbol bursts and then applies the FFT to recover N frequency domain symbols for each successive OFDM burst.

In one embodiment, at least v of the N frequency domain symbols are training symbols having known transmitted values. At step 304, a training symbol separation block 412 extracts the training symbols from each burst. Spatial processing according to one embodiment of the present invention depends in part on estimating the response of the channel for every frequency domain subchannel n among N frequency domain symbols. This is the function of a channel estimation processor 414. The received values of the training symbols are used to determine the channel response over the entire available frequency domain channel. Details of channel estimation techniques are described in WO98/09385 and in co-filed U.S. patent application Ser. No. 09/234,929. The entire contents of both documents are herein incorporated by reference. To facilitate spatial processing, channel estimation processor 414 generates an intermediate channel response estimate for each training symbol position within the burst:

$$B(n)=Y_T(n)/(Z_T(n)/|Z_T(n)|)=Y_T^*(n)Z_T(n)/|Z_T(n)| n= 0,1,\ldots,v-1.$$

where $Y_T(n)$ is the received training symbol value and $Z_T(n)$ is the transmitted training symbol at frequency domain subchannel n.

At step 306, the interference and/or noise present on the training symbols as received is estimated and statistically characterized for each antenna by a first statistical characterization block 416. Because the transmitted values of the training symbols are known, it is not necessary to base this estimate of interference and/or noise on an estimate of the transmitted symbol that may itself be corrupted. The interference and/or noise for each training symbol is estimated by:

$$W_{Ti}(n, b) = \frac{1}{2}(B_i(n, b) - B_i(n, b-1)), i \in \{0, 1, \ldots, v-1\}.$$

where i identifies the antenna and b identifies the burst in sequence.

The $W_{Ti}$ values are used to construct a rank-one covariance matrix:

$$R_T(n) = \begin{bmatrix} W_{T1}(n) \\ W_{T2}(n) \end{bmatrix} [W_{T1}^*(n) W_{T2}^*(n)] = \begin{bmatrix} |W_{T1}(n)|^2 & W_{T1}(n)W_{T2}^*(n) \\ W_{T2}(n)W_{T1}^*(n) & |W_{T2}(n)|^2 \end{bmatrix},$$

$$n \in \{0, 1, \ldots, v-1\}$$

The matrix includes both autocorrelation and cross-correlation elements. Because of the symmetry in this matrix, only four real quantities need to be computed: the (real) diagonal elements, and the real and imaginary parts of either off-diagonal element.

Each matrix is averaged over bursts using a single-pole filter:

$$R_{T,avg}(n,b) = (1-\beta)R_{T,avg}(n,b-1) + \beta R_T(n,b) n \in \{0,1,\ldots,v-1\}$$

β is a programmable real constant in the range [0,1]; to simplify implementation, it is preferably equivalent to $1-2^{-p}$, where $p \in \{1,2,3,4,5,6\}$.

At step 308, the data symbols received from each antenna are combined by a combining block 418 using the statistical characterization formed at step 306. For each data symbol, the following quantity is computed:

$$\hat{Z}_{hard}(n) = \left([H_1^*(n)H_2^*(n)][adjR_{T,avg}(t_{near}(n))]\begin{bmatrix} H_1(n) \\ H_2(n) \end{bmatrix}\right)^{-1}$$

$$\left([H_1^*(n)H_2^*(n)][adjR_{T,avg}(t_{near}(n))]\begin{bmatrix} Y_1(n) \\ Y_2(n) \end{bmatrix}\right)$$

$n \in \{$all data symbols$\}$ $t_{near}(n) = \lfloor vn/N + 1/2 \rfloor$

The above expression represents a weighting of the Y[n] values received via each antenna i as specified by the $R_T$ matrix and the estimated channel response. At step 310, this complex value is then rounded to the nearest constellation point used by the transmitted symbols. The function $t_{near}(n)$ is used to select the R matrix from the closest training tone to perform the combining. The result is a hard decision estimate for each data symbol.

Then at step 312, a second statistical characterization block 420 determines the noise and/or interference on the data symbols based on the data symbol hard decisions determined at step 310. This is done by finding, for each antenna, the difference between the data symbols as received and the hard decision values determined at step 310:

$$W_i(n) = \begin{cases} Y_1(n) - H_i(n)Z_{hard}(n) & k \in \{\text{data symbols}\} \\ Y_i(n) & k \in \{\text{zero symbols}\} \end{cases} i \in \{1, 2\}$$

Where $H_i(n)$ is a channel estimate provided by channel estimation processor 414.

Note that the above assumes that some of the frequency domain symbols are set to zero at the transmit side which is typically done to control out-of-band emissions. Then, for each symbol position, including data symbols, training symbols, and zero symbols, an intermediate covariance matrix, R, is constructed:

$$R(n) = \begin{cases} \begin{bmatrix} |W_1|^2 W_1 W_2^* \\ W_2 W_1^* |W_2|^2 \end{bmatrix} & n \in \{\text{data symbols or zero symbols}\} \\ R_{T,avg}(nv/N) & n \in \{\text{training symbols}\} \end{cases}$$

Note that the covariance matrices RT for the training symbols are taken from the calculation of step 306. Second statistical characterization block 420 then smoothes the R matrix values over frequency:

$$R_{avg}(n) = \frac{1}{N_{term}} \sum_{m=n-\lfloor N_{term}/2 \rfloor}^{n-\lfloor N_{term}/2 \rfloor + N_{term}} R(m)$$

where $N_{term}$ is equal to 9 in one embodiment.

At step 314, a soft decision value system 422 develops estimates of the transmitted data symbol values that take into account the second statistical characterization of noise and/or interference developed by block 420. This is a reweighting among antennas. For each data symbol, the soft decision value is:

$$\hat{Z}(n) =$$

$$\left([H_1^*(n)H_2^*(n)][adjR_{avg}(n)]\begin{bmatrix} H_1(n) \\ H_2(n) \end{bmatrix}\right)^{-1} \left([H_1^*(n)H_2^*(n)][adjR_{avg}(n)]\begin{bmatrix} Y_1(n) \\ Y_2(n) \end{bmatrix}\right)$$

where $H_i(n)$ is the channel response at symbol position n as developed by channel estimation processor 414 for antenna i. Soft decision value system 422 also determines a confidence value for each data symbol that indicates the reliability of the soft decision value estimate. This confidence value allows the decoding system to assign greater weight to symbols received via frequency domain subchannels having relatively high signal to noise plus interference ratios. The confidence value is determined by:

$$\bar{q}(n) = (det\, R_{avg}(n))^{-1}\left([H_1^*(n)H_2^*(n)][adj\, R_{avg}(n)]\begin{bmatrix} H_1(n) \\ H_2(n) \end{bmatrix}\right) n \in$$

{all data symbols}

The output of soft decision system 422 consists of the soft decision and confidence values for individual symbols. It is preferable, however, to develop cost metric values for individual bits. These cost metric values can then be the input to a Viterbi decoder. The process of developing cost metric values for individual bits is referred to as constellation bit mapping.

At step 316, a constellation bit mapping block 424 determines cost metric values for individual bits. Each symbol soft decision value is a complex value including an I (in-phase) and Q (quadrature) component. Each symbol represents m bits. The m bits are divided into two groups of m/2 bits, one group representing the I axis and the other group representing the Q axis. The constellation bit mapping process is performed separately for each group.

If 256-QAM is the constellation scheme used to transform bits to be transmitted to frequency domain symbols, m=8. The soft decision value for each group of m/2 bits is initially determined by calculations:

$$s_0 = \hat{Z} s_1 = 2^{m/2-2} - |s_0| s_2 = 2^{m/2-3} - |s_1| s_3 = 2^{m/2-4} - |s_2|$$

For smaller constellations, only the first m/2 of the above equations are used (1 for QPSK, 2 for 16QAM, 3 for 64QAM.) These bit by bit soft decision values should then be scaled to form:

$$w = s/(\alpha \bar{q})$$

where $\alpha$ is a programmable scaling factor.

These scaled soft decision values are then the input to a Viterbi decoder 426. Viterbi decoder 426 decodes according to the convolutional coding scheme applied at the transmit side.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. For example, all formulas given above are merely representative of procedures that may be used. The present invention may be applied to either wired or wireless systems. Instead of multiple antennas, a receiver according to the invention may take advantage of any multiple outputs from a communication channel. All publications, patents, and patent applications cited herein are hereby incorporated by reference.

What is claimed is:

1. In a digital communication system, a method for receiving an OFDM signal via a plurality of outputs of a channel in the presence of noise and/or interference, the method comprising:
   receiving an OFDM burst via the plurality of channel outputs;
   separating training symbols of said OFDM burst;
   forming a first statistical characterization of noise and/or interference based on said training symbols received via said plurality of channel outputs; and
   combining data symbols of said OFDM burst as received via said plurality of channel outputs based on said first statistical characterization to form combined data symbol estimates; and
   wherein forming said first statistical characterization comprises smoothing said first statistical characterization over time.

2. The method of claim 1 further comprising:
   forming a second statistical characterization of noise and/or interference based on said combined data symbol estimates; and
   recombining said data symbols of said OFDM burst as received via said plurality of channel outputs based on said second statistical characterization.

3. The method of claim 1 wherein combining comprises:
   weighting data symbols received via said plurality of channel outputs according to said first statistical characterization to form weighted data symbols; and
   forming said combined data symbol estimates by finding closest possible transmitted data symbols to said weighted data symbols.

4. The method of claim 1 further comprising:
   estimating characteristics of said channel and using said channel characteristics in combining said data symbols.

5. The method of claim 2 wherein recombining comprises:
   forming cost metric values suitable for input to a Viterbi decoding process.

6. The method of claim 5 further comprising:
   using said cost metric values in said Viterbi decoding processing.

7. The method of claim 1 wherein said plurality of channel outputs comprise multiple antennas.

8. In a digital communication system, a method for receiving an OFDM signal via a plurality of outputs of a channel in the presence of noise and/or interference, the method comprising:
   receiving an OFDM burst via the plurality of channel outputs;
   separating training symbols of said OFDM burst;
   forming a first statistical characterization of noise and/or interference based on said training symbols received via said plurality of channel outputs;
   combining data symbols of said OFDM burst as received via said plurality of channel outputs based on said first statistical characterization to form combined data symbol estimates;
   forming a second statistical characterization of noise and/or interference based on said combined data symbol estimates; and
   recombining said data symbols of said OFDM burst as received via said plurality of channel outputs based on said second statistical characterization; and
   wherein forming said second statistical characterization comprises smoothing said second statistical characterization over frequency.

9. In a digital communication system, apparatus for receiving an OFDM signal via a plurality of outputs of a channel in the presence of noise and/or interference, said apparatus comprising:
   a receiver that receives an OFDM burst via the plurality of channel outputs;
   a separation system that separates out training symbols from said OFDM bursts received via said plurality of channel outputs;
   a first statistical characterization block that forms a first statistical characterization of noise and/or interference based on said training symbols received via said plurality of channel outputs; and
   a combination block that combines data symbols of said OFDM burst as received via said plurality of channel outputs based on said first statistical characterization to form combined data symbol estimates; and
   wherein said first statistical characterization block smoothes said first statistical characterization over time.

10. The apparatus of claim 9 further comprising:
    a second statistical characterization block that forms a second statistical characterization of noise and/or interference based on said combined data symbol estimates; and
    a recombination block that recombines said data symbols of said OFDM burst as received via said plurality of channel outputs based on said second statistical characterization.

11. The apparatus of claim 9 wherein said combination block weights data symbols received via said plurality of channel outputs according to said first statistical characterization to form weighted data symbols, and forms said combined data symbol estimates by finding closest possible transmitted data symbols to said weighted data symbols.

12. The apparatus of claim 9 further comprising:
a channel estimator that estimates characteristics of said channel.

13. The apparatus of claim 10 wherein said recombination block forms cost metric values suitable for input to a Viterbi decoder.

14. The apparatus of claim 13 comprising:
said Viterbi decoder.

15. The apparatus of claim 9 wherein said plurality of channel outputs comprise multiple antennas.

16. In a digital communication system, apparatus for receiving an OFDM signal via a plurality of outputs of a channel in the presence of noise and/or interference, said apparatus comprising:
a receiver that receives an OFDM burst via the plurality of channel outputs;
a separation system that separates out training symbols from said OFDM burst received via said plurality of channel outputs;
a first statistical characterization block that forms a first statistical characterization of noise and/or interference based on said training symbols received via said plurality of channel outputs;
a combination block that combines data symbols of said OFDM burst as received via said plurality of channel outputs based on said first statistical characterization to form combined data symbol estimates;
a second statistical characterization block that forms a second statistical characterization of noise and/or interference based on said combined data symbol estimates; and
a recombination block that recombines said data symbols of said OFDM burst as received via said plurality of channel outputs based on said second statistical characterization; and
wherein said recombination block smoothes said second statistical characterization over frequency.

17. A computer program product for receiving an OFDM signal via a plurality of outputs of a channel in the presence of noise and/or interference, said product comprising:
code that causes receiving of an OFDM burst via the plurality of channel outputs;
code that causes separation of training symbols of said OFDM burst;
code that causes formation of a first statistical characterization of noise and/or interference based on said training symbols received via said plurality of channel outputs;
code that causes combination of data symbols of said OFDM burst as received via said plurality of channel outputs based on said first statistical characterization to form combined data symbol estimates; and
a computer-readable storage medium for storing the codes; and
wherein said code that causes formation of said first statistical characterization comprises code that causes smoothing of said first statistical characterization over time.

18. The product of claim 17 further comprising:
code that causes formation of a second statistical characterization of noise and/or interference based on said combined data symbol estimates; and
code that causes recombination of said data symbols of said OFDM burst as received via said plurality of channel outputs based on said second statistical characterization.

19. The product of claim 17 wherein said code that causes combination comprises:
code that causes weighting of data symbols received via said plurality of channel outputs according to said first statistical characterization to form weighted data symbols; and
code that causes formation of said combined data symbol estimates by finding closest possible transmitted data symbols to said weighted data symbols.

20. The product of claim 17 further comprising:
code that causes estimation of characteristics of said channel and uses said channel characteristics in combining said data symbols.

21. The product of claim 18 wherein said code that recombines comprises:
code that causes formation of cost metric values suitable for input to a Viterbi decoding process.

22. The product of claim 21 comprising;
code that causes performance of said Viterbi decoding process.

23. The product of claim 17 wherein said plurality of channel outputs comprise multiple antennas.

24. A computer program product for receiving an OFDM signal via a plurality of outputs of a channel in the presence of noise and/or interference, said product comprising:
code that receives an OFDM burst via said plurality of channel outputs;
code that separates training symbols of said OFDM burst;
code that forms a first statistical characterization of noise and/or interference based on said training symbols received via said plurality of outputs;
code that combines data symbols of said OFDM burst as received via said plurality of channel outputs based on said first statistical characterization to form combined data symbol estimates;
code that causes formation of a second statistical characterization of noise and/or interference based on said combined data symbol estimates;
code that causes recombination of said data symbols of said OFDM burst as received via said plurality of channel outputs based on said second statistical characterization; and
a computer-readable storage medium for storing the codes;
wherein said code that forms said second statistical characterization comprises code that smoothes said second statistical characterization over frequency.

25. Apparatus for receiving an OFDM signal via a plurality of outputs of a channel in the presence of noise and/or interference, said apparatus comprising:
means for receiving an OFDM burst via the plurality of channel outputs;
means for separating training symbols of said OFDM burst;
means for forming a first statistical characterization of noise and/or interference based on said training symbols received via said plurality of channel outputs; and
means for combining data symbols of said OFDM burst as received via said plurality of channel outputs based on said first statistical characterization to form combined data symbol estimates; and
wherein said means for forming said first statistical characterization comprises means for smoothing said first statistical characterization over time.

* * * * *

UNITED STATES PATENT AND TRADEMARK OFFICE
CERTIFICATE OF CORRECTION

PATENT NO. : 6,973,134 B1
DATED : December 6, 2005
INVENTOR(S) : Jones IV et al.

It is certified that error appears in the above-identified patent and that said Letters Patent is hereby corrected as shown below:

<u>Column 7,</u>
Line 11, change:

" $s_0 = \hat{Z} s_1 = 2^{m/2-2} - |s_0| \; s_2 = 2^{m/2-3} - |s_1| \, |s_1| \; s_3 = 2^{m/2-4} - |s_2|$ " to -- $s_0 = \hat{Z}$  $s_1 = 2^{m/2-2} - |s_0|$  $s_2 = 2^{m/2-3} - |s_1|$  $s_3 = 2^{m/2-4} - |s_2|$ --.

<u>Column 8,</u>
Line 43, change "said OFDM bursts" to -- said OFDM burst --.

Signed and Sealed this

Seventh Day of February, 2006

JON W. DUDAS
*Director of the United States Patent and Trademark Office*